S. Halliwell.
Tube Cutting Mach.
No. 96,912.  Patented Nov. 16, 1869.
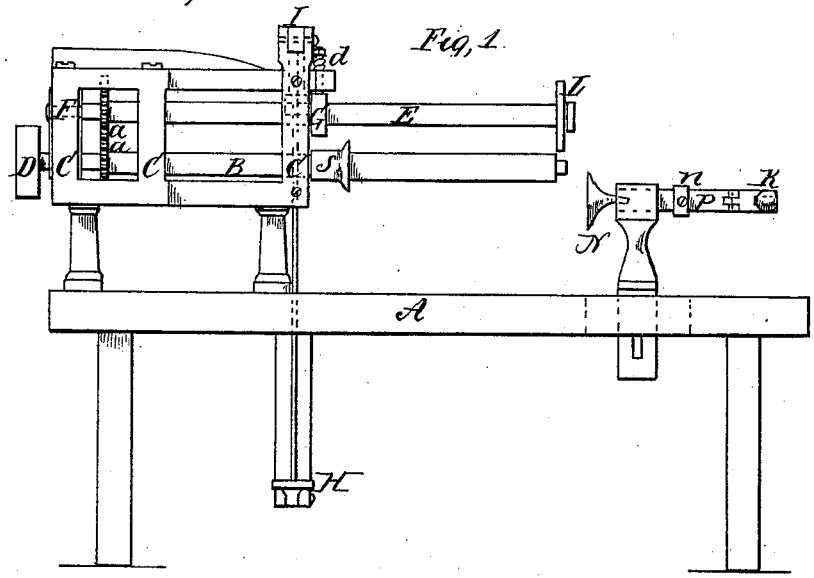
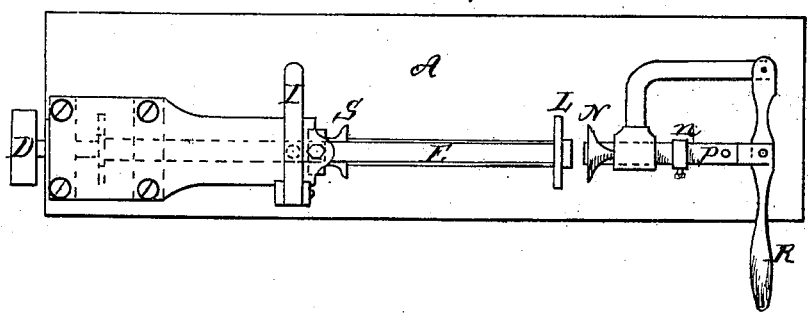
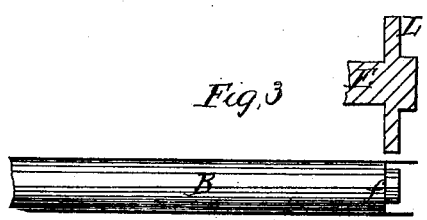
Witnesses,
J. H. Shumway
Michael Ryan
Inventor
Samuel Halliwell
By his Attorney
John E. Earle

United States Patent Office.

SAMUEL HALLIWELL, OF NEW HAVEN, CONNECTICUT.

Letters Patent No. 96,912, dated November 16, 1869.

IMPROVED TUBE-CUTTING MACHINE.

The Schedule referred to in these Letters Patent and making part of the same

*To all whom it may concern:*

Be it known that I, SAMUEL HALLIWELL, of New Haven, in the county of New Haven, and State of Connecticut, have invented a new Improvement in Tube-Cutting Machine; and I do hereby declare the following, when taken in connection with the accompanying drawings, and the letters of reference marked thereon, to be a full, clear, and exact description of the same, and which said drawings constitute part of this specification, and represent, in—

Figure 1, a side view;

Figure 2, a top view; and in

Figure 3, a longitudinal section, illustrating the operation of the machine.

This invention relates to an improvement in machine for cutting off tubing, the object being to cut so that the parts cut off will fall from the machine without removing the principal tubing therefrom, as is the case in tube-cutting machines as heretofore constructed; and The invention consists in the arrangement of a revolving mandrel, over which the tube to be cut is placed, combined with a rotating cutter, operating in connection with the said mandrel, so as to form a shear-edge, and provided with suitable guides, to govern the length of the cuttings.

This invention is designed, more particularly for cutting tin tubing, for the manufacture of spice-boxes, but is alike applicable to other purposes.

A is the bed of the machine, supported upon suitable legs, or otherwise.

B is a mandrel, arranged in suitable bearings, C, and caused to revolve by the application of power thereto, through the pulley D.

E is an arbor, which revolves in connection with the mandrel B, by means of gears $a$.

The arbor E is hung in a bearing at F, the other bearing, G, being arranged so as to be raised up and down, or moved to or from the mandrel, by means of a treadle, H, arranged here so as to be pressed down by the connection of the said treadle to a lever, I, and raised by a spring, $d$, when freed from the depression of the treadle.

Upon the end of the arbor E, a cutter, L, is arranged, and a shoulder, $f$, is formed on the mandrel B, so that the said shoulder and cutter, revolving together, form a rotating shear. Therefore, when the tubing is placed upon the mandrel B, as denoted in the drawings, and the cutter brought down on to the tubing, the tubing and mandrel revolving together, will cut the tubing off at that point.

To govern the length of the tubing to be cut, I arrange a guide, N, in a slide, P, operated by a lever, R, and with a collar, $n$, on the slide, adjustable so as to govern the position of the guide N.

After the tube is put on to the mandrel, the guide N is brought up, by means of the lever R, to the desired point, determined by the position of the collar $n$, then the tubing on the mandrel is drawn out until it strikes the guide N, then the cutter is brought down on to, and so as to cut the tubing, as before described.

A slide, S, is arranged upon the mandrel, by means of which to move the tubing forward, and prevent its being forced back during the process of cutting.

I claim, as my invention—

The revolving mandrel B, constructed with the shoulder $f$, combined with the revolving arbor E, provided with the cutter L, and with the guide N, and collars $s$ $n$, arranged so as to govern the length of the cuts, the whole constructed and operating in the manner described.

SAMUEL HALLIWELL.

Witnesses:
J. H. SHUMWAY.
MICHAEL RYAN.